ized Patent [19]

United States Patent [19]  [11] Patent Number: 4,508,567
Mizuno et al.  [45] Date of Patent: Apr. 2, 1985

[54] PRESS-MOLDING PROCESS FOR PREPARING A POWDER COMPACT

[75] Inventors: Shigeru Mizuno; Masahiko Suzuki; Haruki Mizuno; Masutaro Katsu, all of Nagoya, Japan

[73] Assignee: Brother Kogyo Kabushiki Kaisha, Nagoya, Japan

[21] Appl. No.: 391,879

[22] Filed: Jun. 24, 1982

[30] Foreign Application Priority Data

Jul. 2, 1981 [JP] Japan ................. 56-103767

[51] Int. Cl.³ ............................. B22F 1/00
[52] U.S. Cl. ...................... 75/231; 419/65; 419/66; 29/596
[58] Field of Search ............ 15/231; 419/10, 24, 419/30, 61, 62, 65; 148/104, 105, 122; 29/608; 428/539.5

[56] References Cited

U.S. PATENT DOCUMENTS

| 3,463,047 | 8/1969 | Germershausen | 419/65 |
| 3,732,617 | 5/1973 | Rowe et al. | 29/608 |
| 4,104,176 | 8/1978 | Bidler | 252/12.2 |
| 4,242,398 | 12/1980 | Segawa et al. | 181/294 |
| 4,246,316 | 1/1981 | Aonuma et al. | 75/229 |

FOREIGN PATENT DOCUMENTS

| 55/50605 | 4/1980 | Japan | 148/104 |
| 55/91803 | 7/1980 | Japan | 148/104 |
| 55/130103 | 10/1980 | Japan | 148/104 |
| 750584 | 7/1980 | U.S.S.R. | 75/229 |
| 765891 | 9/1980 | U.S.S.R. | 148/104 |

OTHER PUBLICATIONS

Hausner, *Handbook of Powder Metallurgy*, Chemical Publishing Co., N.Y. (1973), p. 132, TN695,H36h.
*Condensed Chemical Dictionary* Van Nostrand, N.Y. 1977, pp. 86 and 856, QD5C5.

*Primary Examiner*—Ben R. Padgett
*Attorney, Agent, or Firm*—Browdy and Neimark

[57] ABSTRACT

A flux-path forming member of a motor is prepared from a mixture mass by evenly mixing up to 4% of a thermosetting resin binder and molybdenum disulfide with at least 96% of a metal powder, fibrous metal, or a combination thereof; a second step of compacting in a mold under pressure the mixture mass into a desired shape; and a third step of heating, concurrently with or subsequently to the second step, the mixture mass to an elevated temperature to cure the binder portion thereof. The compact prepared by the above process is also disclosed. The content of the thermosetting resin at least 0.2 percent by weight, and the content of the molybdenum disulfide is at least 0.1 percent by weight. The curing operation is conducted at a temperature not higher than 300° C.

9 Claims, No Drawings

PRESS-MOLDING PROCESS FOR PREPARING A POWDER COMPACT

BACKGROUND OF THE INVENTION

The present invention relates generally to a press-molding process for preparing a powder/fiber compact, and more particularly to a process for manufacturing, with high formability and compactibility, a compacted and cured article from a mixture mass of metal and/or ceramic powders, and/or metal fibers such that the obtained article is given a high degree of strength and subjected to least loss or degradation of properties inherent in such materials.

In the field of manufacturing a compact from such materials as metal powder, fibrous metal and/or ceramic powder (hereinafter referred to as "solid fines" when appropriate), it is considered to press-mold or compact a mass of such solid fines in a mold under pressure in the first step. It was recognized in this field that such method was not capable of attaining a sufficient bonding between the solid fines or powder particles and therefore suffered difficulty in obtaining a compact having a practically sufficient strength.

For the above reason, it has been practiced to apply a sintering process to such compact formed of the solid fines for the purpose of increasing the strength thereof. However, the sintering operation requires a high heating temperature near the melting or fusion point of the materials used and consequently needs high consumption of energy such as electric power, and equipment and procedures for careful control of atmospheres within a furnace. The sintering process has a further shortcoming that the use of extremely high temperatures adversely affects the dimensional accuracy of the obtained products or sintered compacts. Thus, the products are usually subjected to a subsequent step of sizing or any other plastic working in order to rectify the dimensional errors or improve the dimensional accuracy of the end products, especially where they are complicated in configuration. It is still very difficult, however, to improve their dimensional accuracy to the target standard.

SUMMARY OF THE INVENTION

The present invention was made in view of the above background. Accordingly, it is an object of the invention to overcome the above-stated problems or shortcoming experienced in the prior art.

It is another object of the invention to provide a process for preparing, with a high degree of formability and compactibility, a powder/fiber compact having high degrees of strength and dimensional accuracy while maintaining properties inherent in metal and/or ceramic materials used.

To attain the above objects, the process according to this invention comprises: a first step of preparing a mixture mass by evenly mixing thermosetting resin binder and molybdenum bisulfide ($MoS_2$) with a major portion of the mixture mass. The major constituent or portion may be a metal powder, fibrous metal or ceramic powder, or a combination thereof. The present process further comprises a second step of compacting in a mold under pressure the mixture mass into a desired shape, and a third step of heating the mass to an elevated temperature to cure or harden the binder portion thereof. This heating or curing step may be conducted concurrently with, or subsequently to, the second step.

According to this invention, a compacted and cured article is prepared simply by compacting or press-molding, in a known manner as used in a conventional press-molding, a mixture mass prepared by mixing thermosetting resin binder and molybdenum disulfide with solid fines such as metal powder, fibrous metal or ceramic powder, or a combination thereof; and by curing the resin binder portion of the obtained compact at a temperature not higher than about 300° C. This simple process is capable of efficiently and economically manufacturing a compacted and cured article having an improved strength and an excellent dimensional accuracy, without the need for special equipment and cumbersome operation for heating and without having to consume a great deal of energy.

It is noted that a compact obtained from a mixture mass including a proper amount of molybdenum disulfide demonstrates a greatly increased strength. This is surprisingly an unexpected result when viewed in the light of a general recognition in this field of the art that the presence of such inclusions in a compact will reduce the strength of that compact. This unexpected result is especially characteristic of the present invention and very significant in consideration of the fact that the strength of a compact can not be improved if a mixture mass for the compact contains known lubricants such as zinc stearate and boron nitride.

Further, the molybdenum disulfide mixed in a proper amount in the mixture mass according to the invention effectively acts as a lubricant between the surface of a die (mold) and the surface of the compacted mass, thereby eliminating the need for coating the die surface with a film of lubricant each time a press-molding cycle is completed, and overcoming the problem of "scratch" phenomenon otherwise occurring on the die surface during a compacting operation. Thus, the use of molybdenum disulfide permits a repetitive service of a die and assures a satisfactory quality of the obtained compacts.

In addition, the effective use of molybdenum disulfide as a lubricant leads to increased density and improved compactibility of the products, and the use of a low curing temperature contributes to enhanced dimensional accuracy of the obtained final products.

A still further advantage of a process of the invention resides in that the properties inherent in metal and/or ceramic materials are faithfully transferred to the obtained compact because of an extremely high proportion of such materials with respect to the total compacted mass. Furthermore, the mixture mass used according to the invention may be easily compacted with a usual press-molding method even though the end products are complicated in configuration.

According to the invention, a metal powder, and/or fibrous metal and/or ceramic powder which is (are) a major portion of a mixture mass to be compacted is (are) generally selected from known materials according to the specific requirement and application of the compact. Those three kinds of materials in the form of solid fines are used singularly or in combination. Specifically, metals and alloys such as iron powders, permalloy (Fe—Ni), sendust (Fe-Si-Al), and ferromagnetic ferrite in the form of particles may be used preferably for compacts for use as a motor core or yoke, and the use of short fibers of magnetic materials (ferrous metal) having a length of about 0.5–10 mm, preferably 1–5 mm, is particularly recommended for a compact used on a motor as a member forming a magnetic flux path or magnetic circuit, from the standpoint of improving its magnetic characteristics.

To the major portion of the mass consisting of at least one of the three kinds of materials; metal powder, short fiber of metal and ceramic powder, are added proper amounts of thermosetting resin acting as a binder and molybdenum disulfide, which are both evenly mixed with the major portion. The obtained mixture mass is then subjected to an intended press-molding operation.

The proportion of the metal powder, short fiber of metal and ceramic powder used singularly or in combination, which is the balance, i.e., the total mass less the thermosetting resin and the molybdenum disulfide, is usually determined according to the required performance or characteristic and application of the products. When a final product is a magnetic flux path forming member of a motor, it is preferable that the proportion of the major portion be not less than 96 percent by weight, i.e. the quantity of $MoS_2$ and thermosetting resin should not exceed 4%. The said proportion may be less than that lower limit, but it is desired to avoid using an excessively small amount of such metal or ceramic powder or fiber materials because their inherent properties are not sufficiently transferred to a compacted article in such instance.

The thermosetting resin which is used according to the invention as a binder constituent of the mixture mass, may be selected from known resins such as epoxy and phenol resins which are cured or hardened at room or elevated temperatures. These thermosetting resins mixed evenly with the above described metal and/or ceramic powders and/or fibrous metal, are used in the form of either solid or liquid, and act as a binder for achieving particle-to particle bonding of the powder and/or fiber. While the strength of a finally obtained compact increases with the content of the binder portion of the mass, the resin content must be usually within the range from 0.2 to 16 percent by weight, and preferably from 0.5 to 12 percent by weight. If the thermosetting resin content is too large, the properties of the metal and/or ceramic materials used as the major portion of the mixture mass will be lost or degraded.

The molybdenum disulfide which provides the effect or result characteristic of this invention is used in a proportion which is determined depending upon the specific kinds of metal/ceramic powders and/or metal fibers, and their nature. For a better result, the molybdenum disulfide content should be not less than 0.1 percent by weight, and preferably not more than 6 percent by weight because its presence in the mixture mass in an excessive amount will adversely affect the properties of the final product.

The mixture mass thus prepared by evenly mixing the above three essential portions with a known method is supplied to a mold and compacted in the mold under pressure (press-molded) in a conventional press-molding manner (as used prior to a sintering step in the art). Then, the thermosetting resin present in the thus obtained compact for bonding of solid fines such as metal powder particles is cured or cross-linked under predetermined curing conditions, preferably at an elevated temperature, whereby a cured compact is finally obtained as the end product. While this curing step is generally conducted after the mixture mass is press-molded or compacted, it is alternatively possible to cure the thermosetting resin concurrently with the press-molding step, i.e., by heating the mold and its content while the content is being compacted. The curing operation is conducted at a temperature below the decomposition point of the thermosetting resin, usually below about 300° C., and preferably within the range of 120°–200° C. Further, it is a characteristic of a process of the invention that the curing operation following the press-molding step may be achieved without having to maintain the compacted article in special atmospheres, viz., the intended curing result is obtained by simply heating the compacted article without carefully controlling the atmosphere. The compacted and thus cured article is satisfactory in quality and performance as the final product. It is also appreciated that a suitable curing catalyst be mixed in the mixture mass as needed to promote the curing reaction.

The cured compact thus obtained according to this invention is significantly improved not only in strength and compactibility, but also in dimensional accuracy because the improved strength and compactibility mean substantial elimination of chances for cracking of the compact, and an effective solution to the "scratch" problem of the die or mold. Thus, the compact is suitably employed as motor cores and yokes, particularly for stepping motors. It is particularly characteristic of a compact of this invention that the compact exhibits properties inherent in the metal and/or ceramics used as the major portion of the mass without adverse effects by molybdenum disulfide mixed in the mass. Such properties given to the compact are effective to enable the compact to be suitably used as such motor components as described above.

The foregoing and other objects, features and advantages of the invention will become apparent from the following description of the preferred embodiments.

DETAILED DESCRIPTION OF THE PREFERRED EMBODIMENTS

The invention will be more clearly and fully understood with reference to the following examples; however, these examples are intended to illustrate the invention and are not to be construed to limit the scope of the invention. Unless otherwise stated, quantities used in the examples are expressed as parts or percentage by weight.

EXAMPLE 1

Two kinds of mixture masses were obtained by evenly mixing the following with a pure iron powder (used as metal powder): 0.5 percent of granular epoxy resin (one-component type; Scotch Cast No. 260 manufactured by Sumitomo 3M in Japan, used as thermosetting resin); and molybdenum disulfide ($MoS_2$) of $4.3\mu$ average grain size in the amounts as indicated in Table 1. For comparison, there were prepared two other kinds of mixture masses which further contain as a known lubricant zinc stearate in the same amounts as the molybdenum disulfide.

Successively, each of these mixture masses was supplied to a respective metal mold, and compacted therein at a pressure of 6 tons/cm², and there was obtained a ring-shaped sample having an outside diameter of 22 mm, an inside diameter of 12 mm and a thickness of 10 mm. Then, the obtained compact was heated to 170° C. and maintained at this temperature for one hour to cure the compacted article. Before the compacts were cured, they were evaluated in terms of compactibility by way of inspecting their surface conditions and checking for ease of their removal or release from the molds.

The cured compacts thus obtained were measured in radial crushing strength according to the Japanese Industrial Standard, JIS-Z-2507. The measured values of their radial crushing strength are listed in Table 1, together with the evaluations of their compactibility.

TABLE 1

| Content (%) | Molybdenum Disulfide (MoS₂) | | Zinc Stearate (St—Zn) | |
|---|---|---|---|---|
| | Radial crushing strength (Kg/mm²) | Compactibility | Radial crushing strength (Kg/mm²) | Compactibility |
| 0.2 | 10.4 | ◎ | 4.0 | ○ |
| 0.4 | 9.7 | ◎ | 2.6 | ○ |

Legend:
◎ ; Good surface conditions and easy removal from the mold.
○ ; Good surface conditions but relatively high pressure required to remove the compact from the mold.

As clearly seen from Table 1, the compacts obtained from the mixture masses containing the molybdenum disulfide exhibit a strength as great as that of plastics for structural applications, and excellent compactibility. It is a surprise that such results are produced with small amounts of thermosetting resin and molybdenum disulfide used in the mixtures. On the other hand, the compacts obtained from the mixture masses containing the known zinc stearate lubricant does not demonstrate a sufficient strength and is less excellent in compactibility.

EXAMPLE 2

Different kinds of mixture masses were prepared by evenly mixing the following with a Ba ferrite powder (used as ceramic powder): thermosetting granular epoxy resin (identical to the one used in Example 1); and molybdenum disulfide or zinc stearate. The contents of the resin, molybdenum disulfide and zinc stearate are indicated in Table 2. The prepared mixture masses were compacted at a pressure of 10 ton/cm², and there were obtained ring-shaped samples each having an outside diameter of 22 mm, an inside diameter of 12 mm and a thickness of 6–7 mm. Successively, the obtained compacts were heated to 180° C. and maintained at this temperature for one hour to cure the compacted articles.

Similar cured compacts were obtained from mixture masses of Ba ferrite powder and epoxy resin which do not contain molybdenum disulfide and zinc stearate at all. The contents of the epoxy resin used in these masses are shown in Table 3.

The cured compacts thus obtained were measured in terms of density and radial crushing strength. The measurements are listed in Table 2 and 3 together with the evaluations of their compactibility.

It is clearly understood from Table 2 in comparison with Table 3 that the strength and compactibility of the compacts whose major portion is Ba ferrite are effectively improved by including molybdenum disulfide in the mass according to this invention.

TABLE 2

| Epoxy resin Content (%) | Molybdenum Disulfide (MoS₂) | | | | Zinc Stearate (St—Zn) | | | |
|---|---|---|---|---|---|---|---|---|
| | Content (%) | Density (g/cm³) | Radial crushing strength (Kg/mm²) | Compactibility | Content (%) | Density (g/cm³) | Radial crushing strength (Kg/mm²) | Compactibility |
| 8.0 | 0.6 | 3.487 | 2.053 | | 0.6 | 3.464 | 1.802 | △ |
| | 3.0 | 3.489 | 3.272 | | 3.0 | 3.386 | 1.796 | △ |
| | 6.0 | 3.525 | 2.955 | | 6.0 | 3.223 | 1.419 | × |
| 12.0 | 1.6 | 3.320 | 4.805 | | 1.6 | 3.279 | 2.786 | |
| | 3.0 | 3.325 | 4.923 | | 3.0 | 3.216 | 2.018 | × |
| | 6.0 | 3.345 | 4.555 | | 6.0 | 3.033 | 1.312 | × |
| 16.0 | 0.8 | 3.132 | 4.586 | | 0.8 | 3.131 | 3.547 | |
| | 1.6 | 3.139 | 4.550 | | 1.6 | 3.107 | 3.121 | |
| | 3.0 | 3.147 | 5.767 | | — | — | — | — |
| | 6.0 | 3.180 | 4.821 | | — | — | — | — |

TABLE 3

| Resin Content (%) | Density (g/cm³) | Radial Crushing Strength (Kg/mm²) | Compactibility |
|---|---|---|---|
| 8.0 | 3.478 | 1.473 | × |
| 12.0 | 3.297 | 4.381 | △ |
| 16.0 | 3.140 | 3.292 | △ |

Legend:
; No cracks recognized.
△; slight cracks recognized.
×; Considerable cracks recognized.

What is claimed is:

1. A flux-path forming member of a motor made of a compacted and cured mixture mass and having high radial crushing strength and density, said flux-path forming member being prepared by a process comprising:
    a first step of preparing a mixture mass by evenly mixing not less than 0.2 percent by weight of thermosetting resin binder and not less than 0.1 percent by weight of molybdenum disulfide with not less than 96 percent by weight of a major portion of said mixture mass, said major portion being a member selected from the group consisting of metal powder, fibrous metal, and a combination thereof, the total content of said thermosetting resin and said molybdenum disulfide being not more than 4 percent by weight;
    a second step of compacting in a mold under pressure said mixture mass into a predetermined shape; and
    a third step of heating, concurrently with or subsequently to said second step, said mass to an elevated temperature to cure the binder portion thereof.

2. A flux-path forming member as recited in claim 1, wherein said third step is conducted at a temperature not higher than 300° C.

3. A flux-path forming member as recited in claim 2, wherein said elevated temperature ranges from 120° C. to 200° C.

4. A flux-path forming member as recited in claim 1, wherein said thermosetting resin binder is epoxy resin.

5. A flux-path forming member as recited in claim 1, wherein said fibrous metal consists of fibers having a length of between 0.5 and 10 mm.

6. A flux-path forming member of a motor made of a press-mold compacted and cured mixture mass and having high radial crushing strength and density, said compact comprising:

not less than 0.2 percent by weight of thermosetting resin, not less than 0.1 percent by weight of molybdenum disulfide, the total content of said thermosetting resin and said molybdenum disulfide being not more than 4 percent by weight; and not less than 96 percent by weight of powdered and/or fibrous metal; a mixture mass of said thermosetting resin, molybdenum disulfide and powdered and/or fibrous metal being compacted in a mold under pressure into said compact, said thermosetting resin being cured at an elevated temperature concurrently with or subsequently to the compaction of said mixture mass.

7. A flux-path forming member as recited in claim 6, which constitutes a core of a motor.

8. A flux-path forming member as recited in claim 6, which constitutes a yoke of a motor.

9. A flux-path forming member as recited in claim 1, wherein in said second step, said pressure is at least about 6 tons/cm$^2$.

* * * * *